(12) United States Patent
Kim et al.

(10) Patent No.: US 12,528,891 B2
(45) Date of Patent: Jan. 20, 2026

(54) HYBRID SUPPORTED METALLOCENE CATALYST AND METHOD FOR PREPARING POLYPROPYLENE USING THE SAME

(71) Applicant: LG CHEM, LTD., Seoul (KR)

(72) Inventors: Byung Seok Kim, Daejeon (KR); Seyoung Kim, Daejeon (KR); Minyoung Kang, Daejeon (KR); Insun Lee, Daejeon (KR); Seok Hwan Kim, Daejeon (KR); Donghyeon Gwon, Daejeon (KR); Yoonchul Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 938 days.

(21) Appl. No.: 17/769,595

(22) PCT Filed: Jul. 6, 2021

(86) PCT No.: PCT/KR2021/008584
§ 371 (c)(1),
(2) Date: Apr. 15, 2022

(87) PCT Pub. No.: WO2022/030768
PCT Pub. Date: Feb. 10, 2022

(65) Prior Publication Data
US 2024/0209126 A1    Jun. 27, 2024

(30) Foreign Application Priority Data
Aug. 4, 2020   (KR) .................... 10-2020-0097412

(51) Int. Cl.
*C08F 4/659* (2006.01)
*C08F 4/646* (2006.01)
*C08F 4/6592* (2006.01)
*C08F 110/06* (2006.01)

(52) U.S. Cl.
CPC ........ *C08F 4/65916* (2013.01); *C08F 4/6465* (2013.01); *C08F 4/65912* (2013.01); *C08F 4/65927* (2013.01); *C08F 110/06* (2013.01)

(58) Field of Classification Search
CPC .......................... C08F 4/65916; C08F 4/6465; C08F 4/65912; C08F 4/65927; C08F 110/06; C08F 2420/00
USPC ....... 502/102, 235, 236, 238, 239, 242, 308, 502/309, 340, 355
See application file for complete search history.

(56) References Cited

U.S. PATENT DOCUMENTS

| | | | | |
|---|---|---|---|---|
| 6,552,210 B1 * | 4/2003 | Gores | ................... | C08F 10/00 556/53 |
| 6,583,238 B1 * | 6/2003 | Gores | ................... | C08F 10/00 502/103 |
| 2004/0048990 A1 | 3/2004 | Brinen et al. | | |
| 2005/0182266 A1 * | 8/2005 | Schulte | ................... | C08F 10/06 556/11 |
| 2006/0142147 A1 | 6/2006 | Royo et al. | | |
| 2014/0088271 A1 * | 3/2014 | Yang | ................... | C08L 23/0815 526/60 |
| 2019/0085100 A1 | 3/2019 | Song et al. | | |
| 2019/0135961 A1 | 5/2019 | Joung et al. | | |

FOREIGN PATENT DOCUMENTS

| | | | | |
|---|---|---|---|---|
| CN | 103502281 A | 1/2014 | | |
| CN | 109476776 A | 3/2019 | | |
| EP | 1300425 A2 * | 4/2003 | ............ | C08F 210/16 |
| EP | 1671983 A1 | 6/2006 | | |
| EP | 3889191 A1 | 6/2021 | | |
| JP | 2015-206034 A | 11/2015 | | |
| KR | 10-1711788 B1 | 3/2017 | | |
| KR | 10-2017-0073463 A | 6/2017 | | |
| KR | 20170073463 A * | 6/2017 | ............ | C08F 10/00 |
| KR | 10-1773722 B1 | 8/2017 | | |
| KR | 10-2017-0099691 A | 9/2017 | | |
| KR | 20170106110 A * | 9/2017 | ............ | C08F 10/00 |
| KR | 10-2019-0074798 A | 6/2019 | | |
| KR | 10-2020-0077331 A | 6/2020 | | |
| WO | 02-060957 A3 | 8/2002 | | |
| WO | 03-106470 A1 | 12/2003 | | |
| WO | WO-2017188588 A1 * | 11/2017 | ............ | C08F 10/02 |
| WO | 2018/110915 A1 | 6/2018 | | |
| WO | 2020-111777 A1 | 6/2020 | | |

OTHER PUBLICATIONS

International Search Report (with partial translation) and Written Opinion issued in corresponding International Patent Application No. PCT/KR2021/008584 on Nov. 3, 2021.
Busico et al., "Microstructure of polypropylene", Progress in Polymer Science, 26(2001), pp. 443-533.

* cited by examiner

*Primary Examiner* — Patricia L. Hailey
(74) *Attorney, Agent, or Firm* — Morgan, Lewis & Bockius LLP

(57) ABSTRACT

Disclosed is a hybrid supported metallocene catalyst exhibiting high activity in propylene polymerization and useful for preparing a polypropylene having high melt strength by introducing long chain branches into the polypropylene molecule, and to a method for preparing a polypropylene using the same.

15 Claims, No Drawings

HYBRID SUPPORTED METALLOCENE CATALYST AND METHOD FOR PREPARING POLYPROPYLENE USING THE SAME

CROSS-REFERENCE TO RELATED APPLICATION(S)

This application claims the benefit of Korean Patent Application No. 10-2020-0097412 filed on Aug. 4, 2020 with the Korean Intellectual Property Office, the disclosures of which are incorporated herein by reference in their entirety.

TECHNICAL FIELD

The present disclosure relates to a hybrid supported metallocene catalyst, and a method for preparing a polypropylene using the same.

BACKGROUND OF ART

Olefin polymerization catalyst systems may be divided into Ziegler-Natta and metallocene catalysts, and these highly active catalyst systems have been developed in accordance with their characteristics.

Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The tacticity, copolymerization characteristics, molecular weight, crystallinity, etc. of the resulting polymer may be controlled by changing a ligand structure of the catalyst and polymerization conditions.

Recently, due to changes in environmental awareness, it has been attempted to reduce the generation of volatile organic compounds (VOCs) in many products. However, the Ziegler-Natta catalyst (Z/N), which is mainly used in the preparation of a polypropylene, has a problem of generating many VOCs. In particular, various commercially available polypropylene products are mainly prepared using the Ziegler-Natta catalyst, but recently, a conversion to products prepared using the metallocene catalyst having low odor and low elution characteristics has been accelerated.

In particular, the conventional polypropylene is a general-purpose resin, and has advantages of being light due to its low density, high rigidity and heat resistance while having low hygroscopicity. However, it has disadvantages of low impact strength and melt strength.

Accordingly, it is required to develop a method for preparing a polypropylene having high melt strength using a metallocene catalyst by introducing long chain branches (LCB) into the polypropylene molecule with high activity in propylene polymerization.

DETAILED DESCRIPTION OF THE INVENTION

Technical Problem

In the present disclosure, there is provided a hybrid supported metallocene catalyst useful for preparing a polypropylene having relatively high melt strength along with excellent catalytic activity in propylene polymerization.

In addition, there is also provided a method for preparing a polypropylene using the hybrid supported metallocene catalyst.

Technical Solution

According to an embodiment of the present disclosure, there is provided a hybrid supported metallocene catalyst, including at least one first metallocene compound selected from compounds represented by the following Chemical Formula 1; at least one second metallocene compound selected from compounds represented by the following Chemical Formula 2; and a support on which the first and the second metallocene compounds are supported, wherein a molar ratio of the first metallocene compound and the second metallocene compound is 4:1 to 1:1:

[Chemical Formula 1]

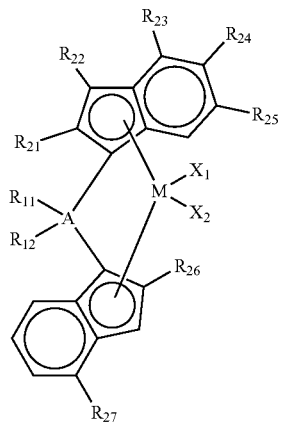

in Chemical Formula 1,

M is a Group 4 transition metal, $X^1$ and $X^2$ are each independently hydrogen; halogen; or $C_{1-20}$ alkyl;

A is carbon, or silicon, $R_{11}$ and $R_{12}$ are each independently hydrogen; halogen; $C_{1-20}$ alkyl; $C_{2-20}$ alkoxyalkyl; or $C_{8-20}$ aryl;

$R_{21}$ is methyl, $R_{22}$ is $C_{3-20}$ alkyl; $C_{3-20}$ alkoxyalkyl; or $C_{3-20}$ alkenyl, $R_{23}$ is unsubstituted $C_{6-20}$ aryl; or $C_{7-20}$ alkylaryl, $R_{24}$ and $R_{25}$ are each hydrogen; or $R_{24}$ and $R_{25}$ are connected with each other to form a $C_{3-10}$ cycloalkane ring, $R_{26}$ is $C_{1-20}$ alkyl, and $R_{27}$ is unsubstituted $C_{8-20}$ aryl; or $C_{7-20}$ alkylaryl,

[Chemical Formula 2]

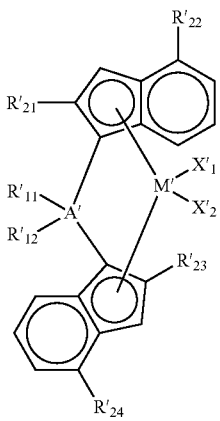

in Chemical Formula 2,
M' is a Group 4 transition metal,
$X'_{11}$ and $X'_{12}$ are each independently halogen,
A' is carbon, or silicon,
$R'_{11}$ and $R'_{12}$ are each independently $C_{1-20}$ alkyl; $C_{6-20}$ aryl; or $C_{2-20}$ alkoxyalkyl,
$R'_{21}$ and $R'_{23}$ are each independently $C_{1-20}$ alkyl, and
$R'_{22}$ and $R'_{24}$ are each independently $C_{6-30}$ alkylaryl; or $C_{6-30}$ aryl.

According to another embodiment of the present disclosure, there is provided a method for preparing a polypropylene, including a step of polymerizing propylene monomers in the presence of the hybrid supported metallocene catalyst.

Advantageous Effects

The hybrid supported metallocene catalyst according to the present disclosure exhibits high activity in propylene polymerization, and can prepare a polypropylene having high melt strength by introducing long chain branches (LCB) into the polypropylene molecule.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "comprise", or "have" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

In the present disclosure, the substituents of Chemical Formulae 1 and 2 will be described in more detail as follows.

The halogen may be fluorine (F), chlorine (Cl), bromine (Br) or iodine (I).

The $C_{1-20}$ alkyl may be linear, branched or cyclic alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, n-propyl, iso-propyl, n-butyl, iso-butyl, tert-butyl, n-pentyl, iso-pentyl, cyclohexyl, or the like, but is not limited thereto.

The $C_{2-20}$ alkenyl may be linear, branched, or cyclic alkenyl. Specifically, the $C_{2-20}$ alkenyl may be $C_{2-20}$ linear alkenyl; $C_{2-10}$ linear alkenyl; $C_{2-5}$ linear alkenyl; $C_{3-20}$ branched alkenyl; $C_{3-15}$ branched alkenyl; $C_{3-10}$ branched alkenyl; $C_{5-20}$ cyclic alkenyl; or $C_{5-10}$ cyclic alkenyl. More specifically, the $C_{2-20}$ alkenyl may be ethenyl, propenyl, butenyl, pentenyl, cyclohexenyl, or the like.

The $C_{1-20}$ alkoxy may be linear, branched, or cyclic alkoxy. Specifically, the $C_{1-20}$ alkoxy may be $C_{1-20}$ linear alkoxy; $C_{1-10}$ linear alkoxy; $C_{1-5}$ linear alkoxy; $C_{3-20}$ branched or cyclic alkoxy; $C_{3-15}$ branched or cyclic alkoxy; or $C_{3-10}$ branched or cyclic alkoxy. More specifically, the $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy, cyclohexyloxy, or the like.

The $C_{2-20}$ alkoxyalkyl may have a structure including $-R_y-O-R_z$, and may be a substituent in which one or more hydrogens of alkyl ($-R_y$) are substituted with alkoxy ($-O-R_z$). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, or the like.

The $C_{6-20}$ aryl may be a monocyclic, bicyclic or tricyclic aromatic hydrocarbon. Specifically, the $C_{6-20}$ aryl may be phenyl, naphthyl, anthracenyl, or the like.

The $C_{7-20}$ alkylaryl may be a substituent in which one or more hydrogens of the aryl is substituted with alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The Group 4 transition metal may be titanium, zirconium, and hafnium.

The hybrid supported metallocene catalyst of the present disclosure includes a first metallocene compound capable of forming a double bond at the terminal and a second metallocene compound exhibiting high polymerizability with respect to alpha-olefin, thereby exhibiting high activity in propylene polymerization. Accordingly, it can prepare a polypropylene having high melt strength by including long chain branches (LCB) in the molecule.

Specifically, the first metallocene compound represented by Chemical Formula 1 includes two indene ligands. One of the two indene rings has a methyl group at the 2nd position, a chain-type substituent having 3 or more carbon atoms at the 3rd position, and a substituent having large steric hindrance at the 4th position. In addition, the other indene ring includes a substituent only at the 2nd and 4th positions, and has a structure including a substituent having large steric hindrance at the 4th position. Due to this structure, the first metallocene compound can form a macromonomer having a double bond at the terminal by inducing beta-methyl extraction of the polymer chain, and long chain branches (LCB) can be introduced into the polypropylene molecule.

In addition, the second metallocene compound represented by Chemical Formula 2 includes two indene ligands having substituents at the 2nd and 4th positions, and has a tether group for facilitating supporting. Due to these structural characteristics, the second metallocene compound exhibits superior catalytic activity in propylene polymerization, exhibits high comonomer incorporation, and can prepare a polymer having high tacticity and high molecular weight.

Therefore, the hybrid supported metallocene catalyst includes the first metallocene compound and the second metallocene compound at the same time, thereby exhibiting high activity in propylene polymerization. In addition, it can introduce long chain branches (LCB) into the polypropylene molecule, thereby preparing a polypropylene with excellent physical properties, especially improved melt strength.

In Chemical Formula 1, the central metal M is a Group 4 transition metal, and may preferably be zirconium (Zr) or hafnium (Hf).

Preferably, $X_1$ and $X_2$ are each independently halogen, and more preferably, both may be chlorine (Cl).

Preferably, A is silicon.

Preferably, $R_{11}$ and $R_{12}$ are each independently $C_{1-10}$ alkyl; $C_{2-10}$ alkoxyalkyl; or $C_{6-10}$ aryl. Preferably, $R_{11}$ and $R_{12}$ are each independently methyl; ethyl; n-propyl; n-butyl; n-pentyl; n-hexyl; t-butoxyhexyl; or phenyl.

More preferably, M is zirconium (Zr) or hafnium (Hf), both of $X_1$ and $X_2$ are chlorine, A is silicon, and $R_{11}$ and $R_{12}$ are each independently methyl; ethyl; n-propyl; n-butyl; n-pentyl; n-hexyl; t-butoxyhexyl; or phenyl.

Preferably, $R_{22}$ is $C_{3-10}$ alkyl; $C_{3-10}$ alkoxyalkyl; or $C_{3-10}$ alkenyl. Preferably, $R_{22}$ is $C_{4-10}$ alkyl; $C_{5-10}$ alkoxyalkyl; or $C_{3-8}$ alkenyl. More preferably, $R_{22}$ is butyl; t-butoxyhexyl; or 2-propenyl.

Preferably, $R_{23}$ is unsubstituted phenyl; or phenyl substituted with $C_{1-10}$ alkyl. More preferably, $R_{23}$ is phenyl; or t-butylphenyl.

Preferably, $R_{24}$ and $R_{25}$ are each hydrogen; or $R_{24}$ and $R_{25}$ are connected with each other to form a cyclopentane ring, or a cyclohexane ring.

Preferably, $R_{27}$ is unsubstituted phenyl; or phenyl substituted with $C_{1-10}$ alkyl. More preferably, $R_{27}$ is phenyl; or t-butylphenyl.

According to one embodiment, in Chemical Formula 1, $R_{11}$ and $R_{12}$ are each independently $C_{1-10}$ alkyl; $C_{2-10}$ alkoxyalkyl; or $C_{6-10}$ aryl;
$R_{22}$ is $C_{3-10}$ alkyl; $C_{3-10}$ alkoxyalkyl; or $C_{3-10}$ alkenyl;
$R_{23}$ is unsubstituted phenyl; or phenyl substituted with $C_{1-10}$ alkyl,
$R_{24}$ and $R_{25}$ are each hydrogen; or $R_{24}$ and $R_{25}$ are connected with each other to form a cyclopentane ring, or a cyclohexane ring, and
$R_{27}$ is unsubstituted phenyl; or phenyl substituted with $C_{1-10}$ alkyl.

Preferably, in Chemical Formula 1, M is zirconium or hafnium,
$X_1$ and $X_2$ are each independently halogen,
A is silicon,
$R_{11}$ and $R_{12}$ are each independently $C_{1-10}$ alkyl; $C_{2-10}$ alkoxyalkyl; or $C_{6-10}$ aryl,
$R_{22}$ is $C_{3-10}$ alkyl; $C_{3-10}$ alkoxyalkyl; or $C_{3-10}$ alkenyl,
$R_{23}$ is unsubstituted phenyl; or phenyl substituted with $C_{1-10}$ alkyl,
$R_{24}$ and $R_{25}$ are each hydrogen; or $R_{24}$ and $R_{25}$ are connected with each other to form a cyclopentane ring, or a cyclohexane ring, and
$R_{27}$ is unsubstituted phenyl; or phenyl substituted with $C_{1-10}$ alkyl.

More preferably, in Chemical Formula 1, M is zirconium (Zr) or hafnium (Hf),
both of $X_1$ and $X_2$ are chlorine,
A is silicon,
$R_{11}$ and $R_{12}$ are each independently methyl; ethyl; n-propyl; n-butyl; n-pentyl; n-hexyl; t-butoxyhexyl; or phenyl;
$R_{22}$ is butyl; t-butoxyhexyl; or 2-propenyl;
$R_{23}$ is phenyl; or t-butylphenyl,
$R_{24}$ and $R_{25}$ are each hydrogen; or $R_{24}$ and $R_{25}$ are connected with each other to form a cyclopentane ring, and
$R_{27}$ is phenyl; or t-butylphenyl.

The first metallocene compound represented by the Chemical Formula 1 may be any one selected from the group consisting of:

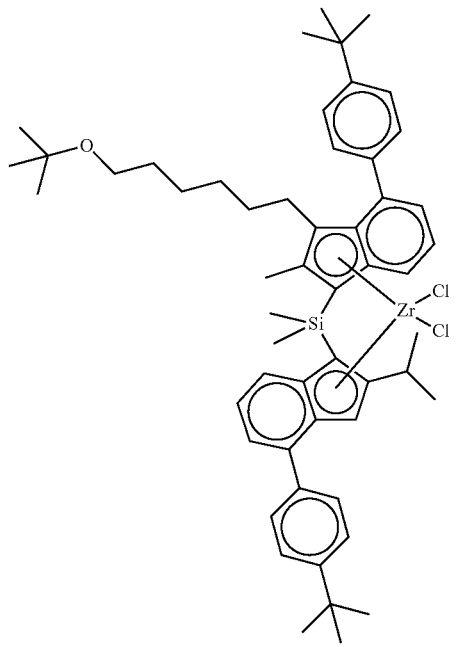

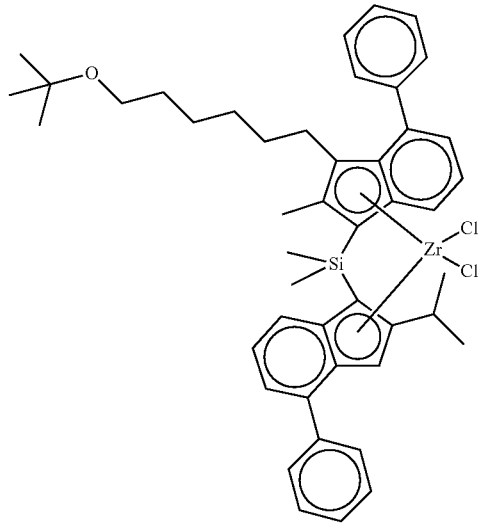

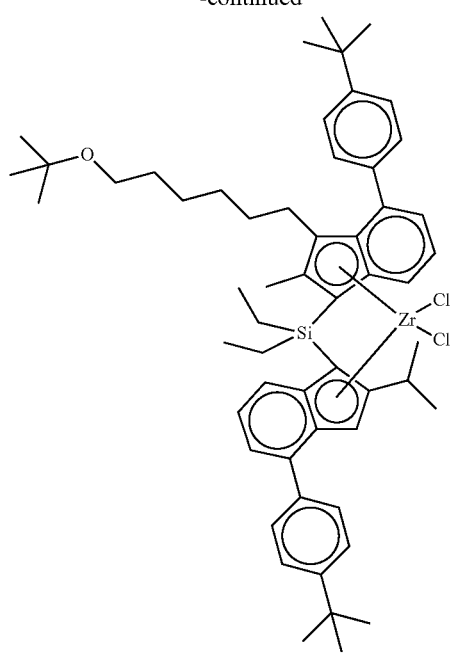
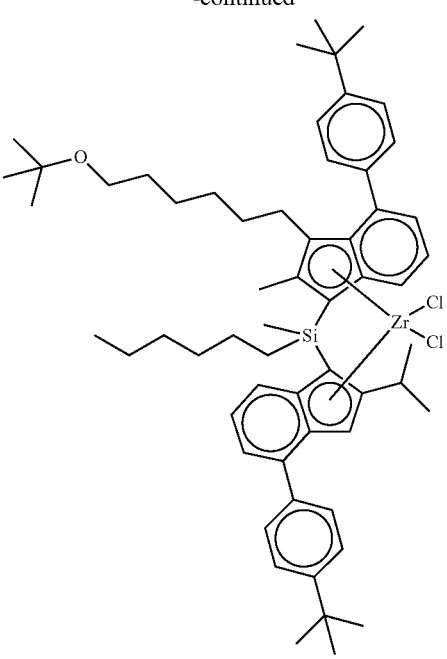
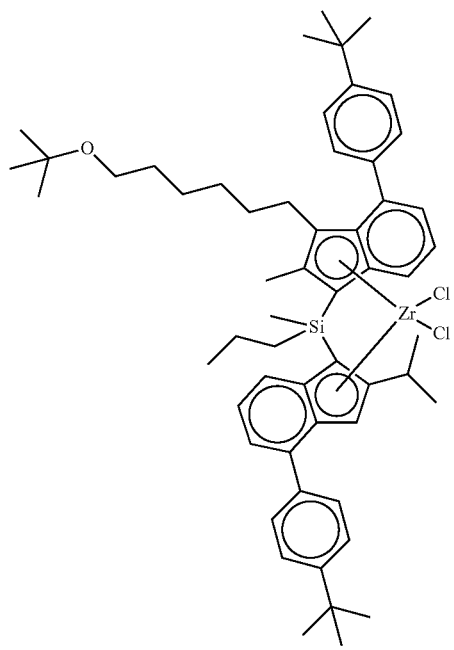

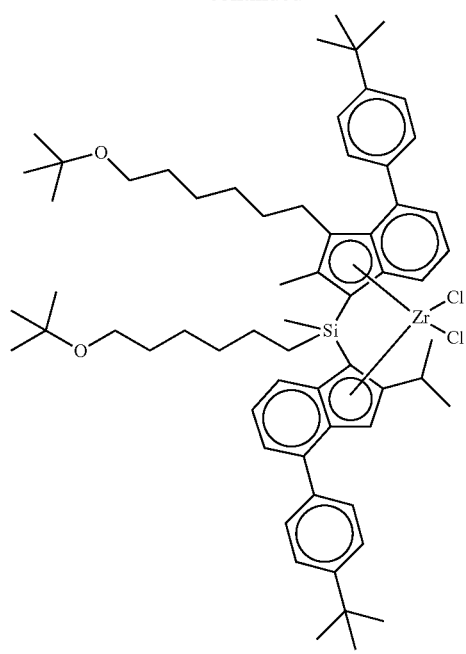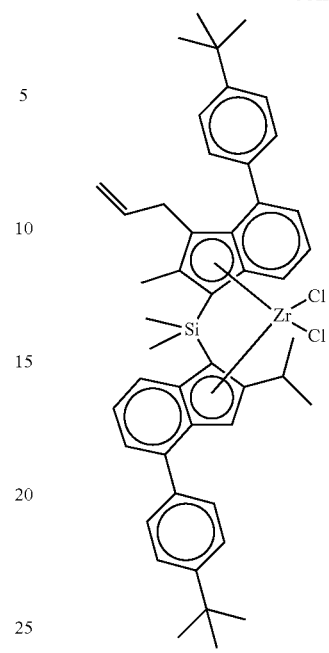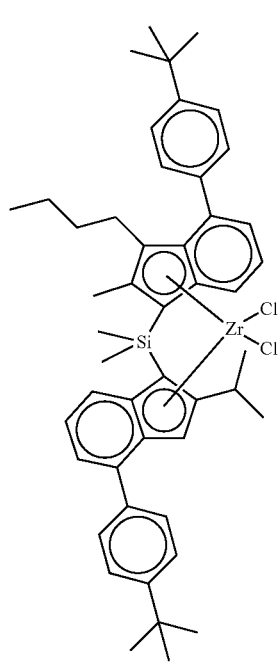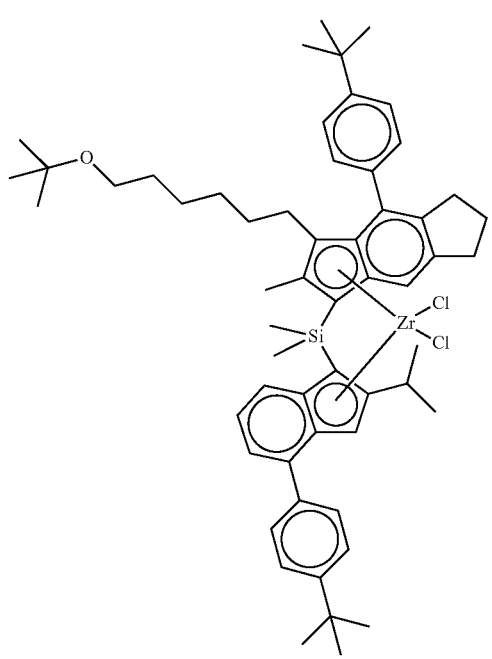

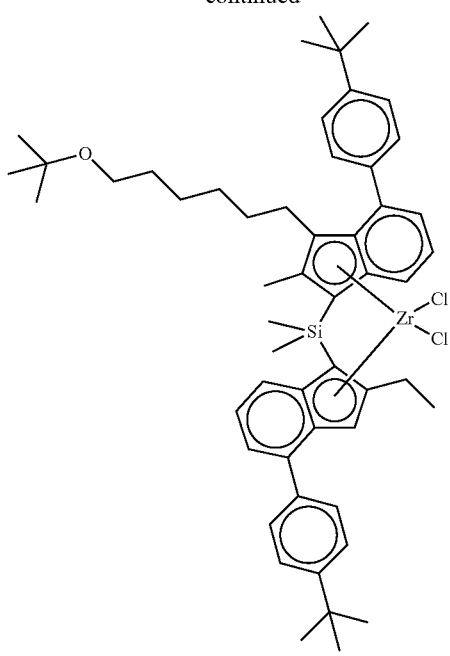
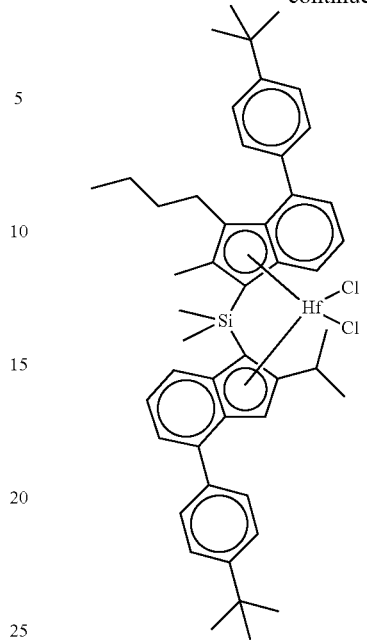

Meanwhile, the method for preparing the first metallocene compound represented by Chemical Formula 1 is not particularly limited, but the compound may be prepared by, for example, the method shown in Reaction Scheme 1 below.

It is difficult to synthesize the compound represented by Chemical Formula 1 due to steric hindrance of the indene ligand, but the method shown in Reaction Scheme 1 may prepare the compound of Chemical Formula 1 in high yield and high purity.

According to one embodiment of the present disclosure, the compound represented by Chemical Formula 1 may be prepared including the steps of:

preparing a compound represented by Chemical Formula 1-1 by reacting a compound represented by Chemical Formula a with a compound represented by Chemical Formula b;

preparing a ligand represented by Chemical Formula 1-2 by reacting a compound 5 represented by Chemical Formula 1-1 with a compound represented by Chemical Formula 1-11; and reacting a ligand represented by Chemical Formula 1-2 with a halogen salt of a transition metal represented by Chemical Formula 1-21.

[Reaction Scheme 1]

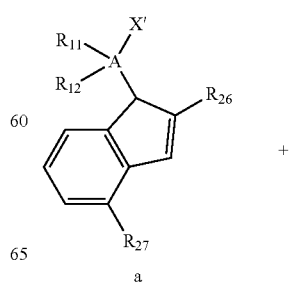

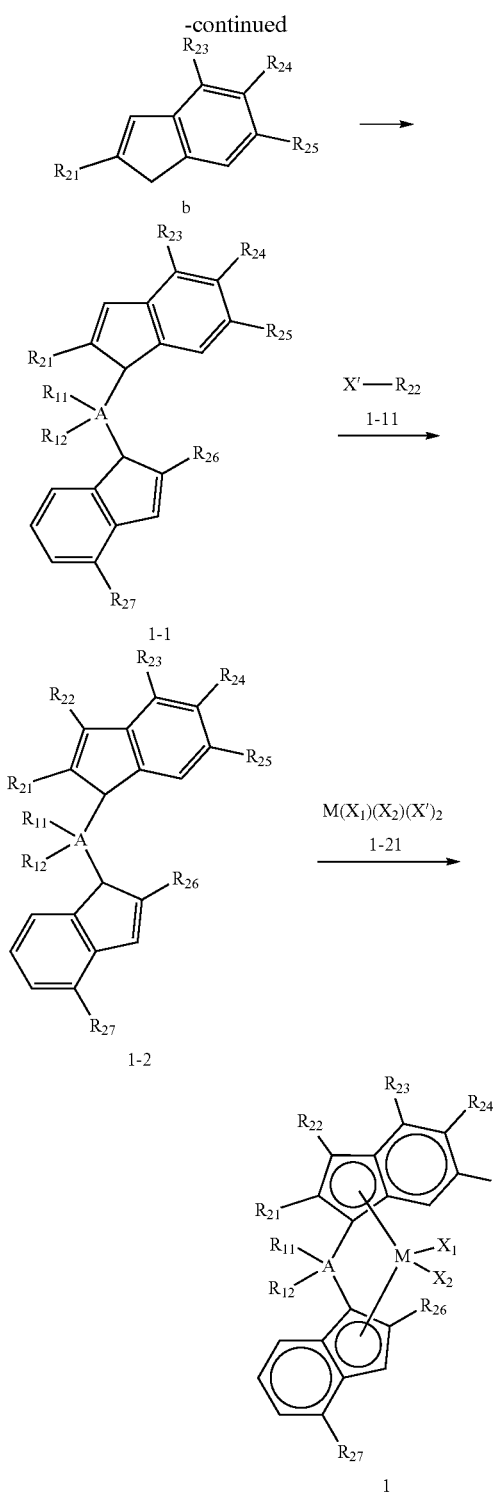

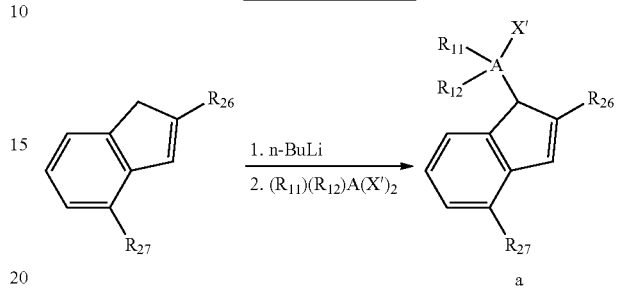

In Reaction Scheme 1,

M, $X_1$, $X_2$, A, $R_{11}$, $R_{12}$, and $R_{21}$ to $R_{27}$ are as defined in Chemical Formula 1, and each X' is independently halogen.

The compound of Chemical Formula 1 includes substituents having large steric hindrance ($R_{23}$ and $R_{27}$) at the 4th position of the indene ligand. Accordingly, as shown in Reaction Scheme 1, the yield of the ligand can be increased by first linking two indene ligands with a bridging group (-A($R_{11}$)($R_{12}$)—) and then introducing a substituent of $R_{22}$.

Herein, the indene ligand a to which the bridging group is bonded may be prepared by reacting an indene ligand with a bridging group-providing compound such as a halogenated silane, as shown in Reaction Scheme 1-1 below.

in Reaction Scheme 1-1,

X', A, $R_{11}$, $R_{12}$, $R_{26}$, and $R_{27}$ are as described in Chemical Formula 1.

Each step of Reaction Scheme 1 may be performed in the presence of an organic base such as alkyl lithium having 1 to 10 carbon atoms, and the step of preparing the compound of Chemical Formula 1-1 may be performed in the presence of the organic base and an inorganic copper salt such as CuCN.

The reaction of each step may be performed by applying known reactions, and the more detailed synthesis method can be referred to Examples to be described later.

In Chemical Formula 2, the central metal M' is a Group 4 transition metal, and may preferably be zirconium (Zr) or hafnium (Hf).

Preferably, $X'_1$ and $X'_2$ are each independently halogen, and more preferably, both may be chlorine (Cl).

Preferably, A' is silicon.

Preferably, $R'_{11}$ and $R'_{12}$ are each independently $C_{1-10}$ alkyl; $C_{2-10}$ alkoxyalkyl; or $C_{6-10}$ aryl.

Preferably, $R'_{11}$ and $R'_{12}$ are each independently $C_{1-6}$ alkyl; or $C_{2-10}$ alkoxyalkyl.

Preferably, $R'_{11}$ and $R'_{12}$ are each independently methyl; ethyl; n-propyl; n-butyl; n-pentyl; n-hexyl; or t-butoxyhexyl.

Preferably, $R'_{21}$ and $R'_{23}$ are each independently $C_{1-10}$ alkyl, and $R'_{22}$ and $R'_{24}$ are each independently $C_{6-10}$ alkylaryl.

Preferably, $R'_{21}$ and $R'_{23}$ are each independently methyl; ethyl; n-propyl; or iso-propyl.

Preferably, $R'_{22}$ and $R'_{24}$ are each independently phenyl or t-butylphenyl.

In a preferred embodiment, $R'_{21}$ and $R'_{23}$ may be the same as each other, and $R'_{22}$ and $R'_{24}$ may be the same as each other.

Preferably, $R'_{11}$ and $R'_{12}$ are each independently $C_{1-10}$ alkyl; $C_{2-10}$ alkoxyalkyl; or $C_{6-10}$ aryl, $R'_{21}$ and $R'_{23}$ are each independently $C_{1-10}$ alkyl, and $R'_{22}$ and $R'_{24}$ are each independently $C_{6-10}$ alkylaryl.

More preferably, M' is zirconium (Zr), both of $X'_1$ and $X'_2$ are chlorine, A' is silicon, $R'_{11}$ and $R'_{12}$ are each independently methyl; ethyl; n-propyl; n-butyl; n-pentyl; n-hexyl; t-butoxyhexyl; or phenyl; $R'_{21}$ and $R'_{23}$ are each independently methyl; ethyl; n-propyl; or iso-propyl; and $R'_{22}$ and $R'_{24}$ are each independently phenyl or t-butylphenyl.

The second metallocene compound represented by the Chemical Formula 2 may be:

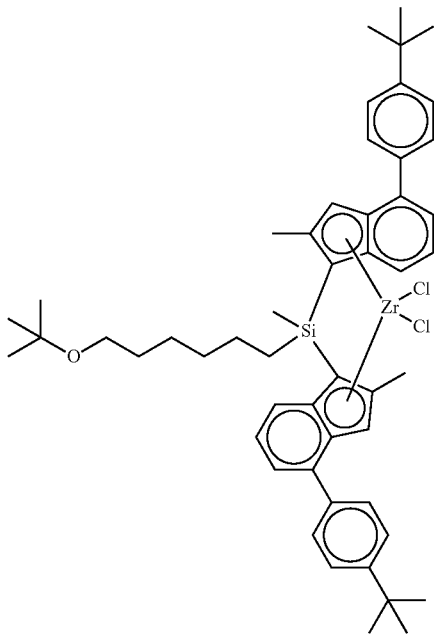

In the hybrid supported metallocene catalyst of the present disclosure, the first metallocene compound and the second metallocene compound are supported in a molar ratio of 4:1 to 1:1.

When the ratio of the first metallocene compound is too high, catalytic activity may 10 be insufficient to reduce productivity, and tacticity during propylene polymerization may be remarkably deteriorated. Conversely, when the ratio of the second metallocene compound is too high, the content of long chain branches (LCB) in the polypropylene molecule may be lowered, thereby lowering the melt strength.

Preferably, the first metallocene compound and the second metallocene compound may be supported in a molar ratio of 3:1 to 1:1, and in this case, the catalyst not only exhibits high activity in propylene polymerization, but also can produce a polypropylene exhibiting excellent physical properties by having a high content of long chain branches in the molecule.

In the hybrid supported metallocene catalyst of the present disclosure, as the support for supporting the first metallocene compound and the second metallocene compound, a support having a highly reactive hydroxyl group, silanol group or siloxane group on its surface may be used. The support may be surface-modified by calcination, or may be dried to remove moisture from the surface. For example, the support may be silica prepared by calcining silica gel, silica dried at high temperatures, silica-alumina, silica-magnesia, or the like, and it may usually contain oxides, carbonates, sulfates, or nitrates such as $Na_2O$, $K_2CO_3$, $BaSO_4$, $Mg(NO_3)_2$ and the like.

The support is preferably calcined or dried at 200 to 700° C.), more preferably 250 to 650° C. When the temperature is excessively low, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is excessively high, pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

For example, the amount of hydroxyl groups on the surface of the support may be 0.1 to 10 mmol/g, or 0.5 to 5 mmol/g. The amount of hydroxyl groups may be controlled by the preparation method, preparation conditions, or drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable.

Among the above-mentioned supports, the silica prepared by calcining silica, particularly silica gel, has little catalyst released from the surface of the support in the polymerization process of the olefin, because the functional groups of the first and second metallocene compounds are chemically bonded to and supported on the silica support. As a result, when the polyolefin is prepared by slurry polymerization or gas phase polymerization, a fouling phenomenon, sticking to the wall surface of the reactor or with each other, may be minimized.

The first and second metallocene compounds may be supported in an amount of 30 μmol or more, or 50 μmol or more, and 150 μmol or less, or 120 μmol or less based on a weight of the support, for example, 1 g of silica. When supported in the above range, the supported catalyst may exhibit appropriate activity, which may be advantageous for maintaining catalytic activity and economic efficiency.

In addition, the hybrid supported metallocene catalyst may further include at least one cocatalyst together with the above-described first and second metallocene compounds and the support.

In addition, the hybrid supported metallocene catalyst according to an embodiment of the present disclosure may further include a cocatalyst in addition to the transition metal compound represented by Chemical Formula 1 and the support. The cocatalyst may include at least one of compounds represented by the following Chemical Formula 3 or Chemical Formula 4.

—[Al($R_{31}$)—O]$_m$—        [Chemical Formula 3]

in Chemical Formula 3, $R^{31}$ are the same as or different from each other, and are each independently halogen, $C_{1-20}$ alkyl or $C_{1-20}$ haloalkyl; and m is an integer of 2 or more.

Examples of the compound represented by Chemical Formula 3 may include aluminoxane-based compounds such as methylaluminoxane, ethylaluminoxane, isobutylaluminoxane, or butylaluminoxane, and any one or a mixture thereof may be used.

J($R_{32}$)$_3$        [Chemical Formula 4]

in Chemical Formula 4, $R_{32}$ are the same as or different from each other, and are each independently halogen, $C_{1-20}$ alkyl or $C_{1-20}$ haloalkyl; and J is aluminum or boron.

Examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and a more preferred compound is selected from trimethylaluminum, triethylaluminum, and triisobutylaluminum.

The cocatalyst may be supported in an amount of 0.5 mmol or more, 1 mmol or more, or 3 mmol or more; and 25 mmol or less, or 20 mmol or less based on a weight of the support, for example, 1 g of support. When supported within the above range, it is possible to obtain an effect of improving catalytic activity as well as an effect of reducing the generation of fine particles.

Meanwhile, the hybrid supported metallocene catalyst may be prepared by a method including the steps of: supporting a cocatalyst on a support; supporting a first metallocene compound on the support where the cocatalyst is supported; and supporting a second metallocene compound on the support where the cocatalyst and the first metallocene compound are supported.

Alternatively, the hybrid supported metallocene catalyst may be prepared by a method including the steps of: supporting a cocatalyst on a support; supporting a second metallocene compound on the support where the cocatalyst is supported; and supporting a first metallocene compound on the support where the cocatalyst and the second metallocene compound are supported.

Alternatively, the hybrid supported metallocene catalyst may be prepared by a method including the steps of: supporting a first metallocene compound on a support; supporting a cocatalyst on the support where the first metallocene compound is supported; and supporting a second metallocene compound on the support where the cocatalyst and the first metallocene compound are supported.

In the above method, the supporting conditions are not particularly limited and the supporting step may be carried out within a range well known to those skilled in the art. For example, the supporting step may be carried out at a high temperature and at a low temperature appropriately. For example, the supporting temperature may be in a range of −30° C. to 150° C., preferably in a range of 50° C. to 98° C., or 50° C. to 95° C. The supporting time may be appropriately controlled depending on the amount of the first and second metallocene compounds to be supported. The reacted supported catalyst may be used as it is after removing the reaction solvent by filtration or distillation under reduced pressure, or subjected to Soxhlet filtering using aromatic hydrocarbon such as toluene, if necessary.

The preparation of the supported catalyst may be carried out in the presence of a solvent or without a solvent. When the solvent is used, it may include aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. It is preferable to use hexane, heptane, toluene, or dichloromethane.

In the present disclosure, in the method for preparing the metallocene compound or the hybrid supported catalyst, the equivalent weight (eq) refers to a molar equivalent weight (eq/mol).

Meanwhile, in the present disclosure, there is provided a method for preparing a polypropylene, including a step of polymerizing propylene monomers in the presence of the hybrid supported metallocene catalyst.

The polymerization reaction may be performed by homopolymerizing propylene using a continuous slurry polymerization reactor, a loop slurry reactor, a gas phase reactor, or a solution reactor.

In addition, the polymerization may be performed at a temperature of 25° C. to 500° C., 25° C. to 300° C., 30° C. to 200° C., 50° C. to 150° C., or 60° C. to 120° C. In addition, the polymerization may be performed at a pressure of 1 kgf/cm$^2$ to 100 kgf/cm$^2$, 1 kgf/cm$^2$ to 50 kgf/cm$^2$, 5 kgf/cm$^2$ to 45 kgf/cm$^2$, 10 kgf/cm$^2$ to 40 kgf/cm$^2$, or 15 kgf/cm$^2$ to 35 kgf/cm$^2$.

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and then injected. The solvent used herein is preferably used after removing a small amount of water or air, which acts as a catalyst poison, by treating with a small amount of alkyl aluminum. It is also possible to further use the cocatalyst.

In particular, the hybrid supported metallocene catalyst according to the present disclosure is useful for preparing a polypropylene having excellent physical properties, especially improved melt strength by introducing long chain branches (LCB) into the polypropylene molecule along with high catalytic activity in propylene polymerization. Specifically, the hybrid supported metallocene catalyst of the present disclosure uses the catalyst precursor of Chemical Formula 2 exhibiting high molecular weight properties during propylene polymerization together with the catalyst precursor of Chemical Formula 1 for synthesizing a macromonomer having a double bond at the terminal, thereby having an advantage in achieving high melt strength by introducing long chain branches (LCB) into the polypropylene molecule.

For example, the polymerization step may be performed while introducing 1500 ppm or less, 1000 ppm or less, or 850 ppm or less, and 200 ppm or more, 250 ppm or more, or 300 ppm or more of hydrogen gas based on the propylene monomers.

In this polymerization process of propylene, the hybrid supported metallocene catalyst of the present disclosure may exhibit high catalytic activity. For example, the catalytic activity during propylene polymerization is calculated by a ratio of the weight of the prepared polypropylene (kg PP) to the mass of the used supported catalyst (g) per unit time (h), and may be 9.0 kg PP/g·cat·hr or more, 11.0 kg PP/g·cat·hr or more, or 12.0 kg PP/g·cat·hr or more, and 50 kg PP/g·cat·hr or less, 40 kg PP/g·cat·hr or less, or 35 kg PP/g·cat·hr or less.

In addition, the polymerization may be a homopolymerization reaction in which the propylene monomers are polymerized alone.

The present disclosure uses a hybrid supported metallocene catalyst in which two or more types of metallocene compounds having specific substituents and structures as described above are supported on a support, and this catalyst exhibits high catalytic activity in polypropylene polymerization and can significantly improve melt strength by introducing long chain branches into the polypropylene molecule. The polypropylene having these properties can be produced in various grades of products with a wide range of applications according to hydrogen reactivity.

For example, the polypropylene may have an elongation viscosity ascent rate (EA) represented by the following Equation 1 of 5.0 or more, preferably 5.3 or more, 5.5 or more, or 5.8 or more, when the elongation viscosity (μ, unit: Pa·s) of the polypropylene is measured at a shear rate of 0.1 $s^{-1}$ at 175° C.:

Elongation viscosity ascent rate (EA)=(Elongation viscosity at a measurement time of 101.1 seconds)/(Elongation viscosity at a measurement time of 10° seconds) [Equation 1]

The elongation viscosity ascent rate is a numerical value related to the melt strength and elongation viscosity of polypropylene, and it can be evaluated that the higher the elongation viscosity ascent rate, the better the melt strength of polypropylene. However, when the elongation viscosity ascent rate is excessively high, workability may be deteriorated, and thus, the elongation viscosity ascent rate may preferably be 8 or less, 7 or less, or 6.5 or less.

In addition, the polypropylene has a high crystallization temperature (Tc) of 120° C. or more, or 125° C. or more, indicating excellent processability. The upper limit of the crystallization temperature is not particularly limited, but may be, for example, 140° C. or less, or 135° C. or less.

The crystallization temperature (Tc) of the polypropylene may be measured using a differential scanning calorimeter (DSC, device name: DSC 2920, manufacturer: TA instrument). Specifically, after heating the polymer to 200° C. by increasing the temperature, the temperature is maintained at that temperature for 5 minutes, and then lowered to 30° C. Thereafter, the temperature is increased again, and the temperature at the top of the DSC curve is measured as the melting point. Then, the temperature was lowered to 30° C. again, and the temperature at the top of the DSC curve is measured as the crystallization temperature. Herein, the temperature is increased and lowered at a rate of 10° C./min, respectively. The melting point and the crystallization temperature are measured in the section where the temperature rises and falls for the second time, respectively. A specific method for measuring the crystallization temperature is as described in Test Examples to be described later.

In addition, the polypropylene may have tacticity (pentad sequence distribution, mmmm) of 60% or more, 70% or more, 75% or more, or 80% or more, and 96% or less, 95% or less, or 94% or less. The polypropylene may maintain the tacticity (pentad sequence distribution, mmmm) within the above-described range to effectively control tacticity of the polymer molecular structure and improve melt strength by introducing long chain branches (LCB) into the molecule.

In the present disclosure, the tacticity (pentad sequence distribution) may be measured using quantitative nuclear magnetic resonance (NMR) spectroscopy. Specifically, it is expressed as % of pentad (mmmm) sequence having tacticity of all pentad sequences, after measuring sequence distribution at pentad level by means of $^{13}$C-NMR. The mmmm % is a value based on moles. A specific method for measuring the tacticity (pentad sequence distribution, mmmm) is as described in Test Examples to be described later.

Hereinafter, the present invention will be described in more detail with the following preferred examples, but these examples are provided for illustrative purposes only. It is apparent to those skilled in the art that various changes and modifications can be made within the scope and spirit of the present invention. Therefore, it is obvious that the changes and modifications are within the scope of the present invention.

EXAMPLES

Preparation of First Metallocene Compound

Synthesis Example 1

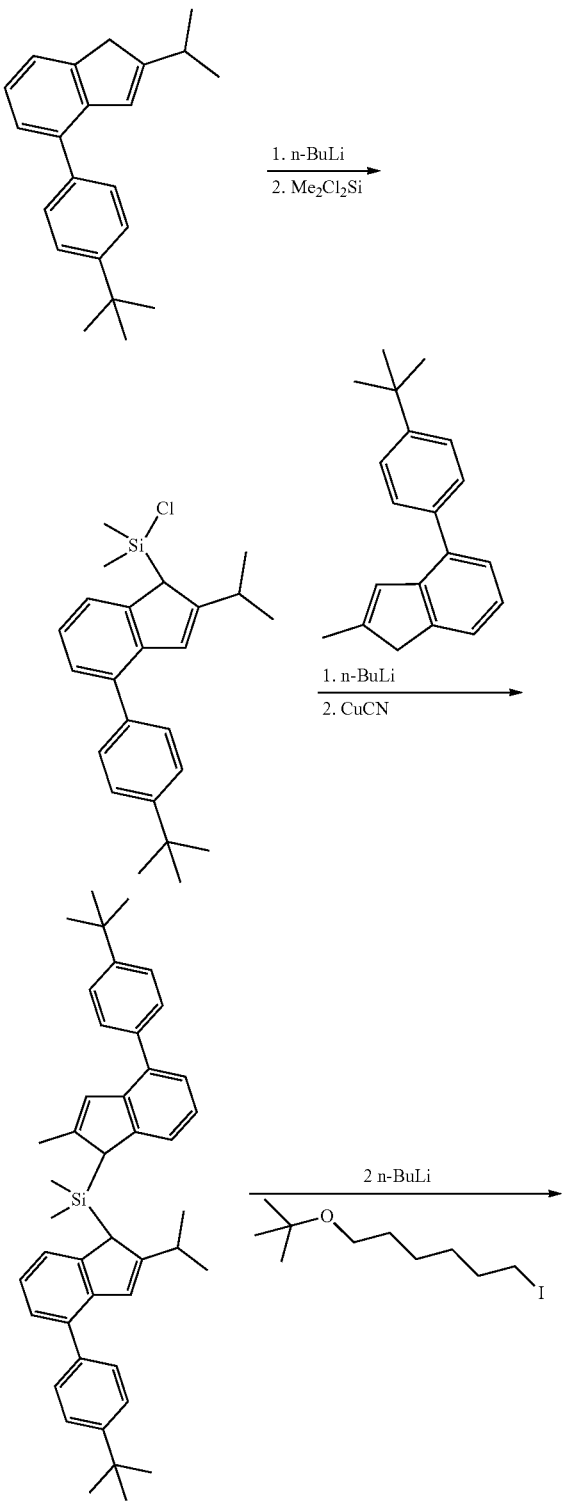

-continued

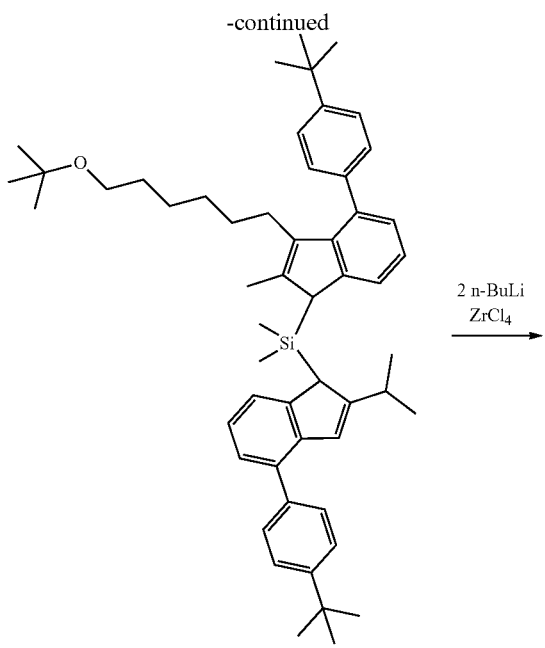

2 n-BuLi
ZrCl₄

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBu-Phenyl Indene (1 eq; hereinafter, eq means a molar equivalent weight (eq/mol)) was dissolved in a mixed solvent of toluene:tetrahydrofuran (THF) (10:1 by volume, 0.5 M; hereinafter, all ratios of solvents are expressed in volume ratios, and the molarity means the number of moles (mol) of the solute with respect to 1 L of the solvent mixed in the corresponding volume ratio.), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature.

In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-butoxyhexyl-iodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene:ether (2:1 by volume, 0.53 M), and n-BuLi (2.05 eq) was added at −25° C., followed by stirring at room temperature for 5 hours. A slurry was prepared by mixing ZrCl₄ (1 eq) with toluene (0.17 M) in a flask, and added thereto, followed by stirring overnight at room temperature.

When the reaction was completed, the solvent was vacuum-dried, and dichloromethane (DCM) was added again. Then, LiCl was removed through a filter, and the filtrate was vacuum-dried. Subsequently, after recrystallization using hexane and DCM, the resulting solid was filtered and vacuum-dried to obtain a solid transition metal compound.

$^1$H-NMR (500 MHZ, CDCl₃): 8.30 (d, 2H), 7.29-7.39 (m, 12H), 6.36 (s, 1H), 3.51 (t, 2H), 2.38 (m, 1H), 2.12 (s, 3H), 1.92 (m, 2H), 1.40-1.50 (m, 8H), 1.31 (s, 18H), 0.91 (d, 6H), 0.86 (s, 6H)

Synthesis Example 2

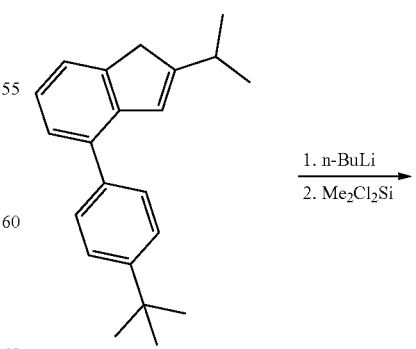

1. n-BuLi
2. Me₂Cl₂Si

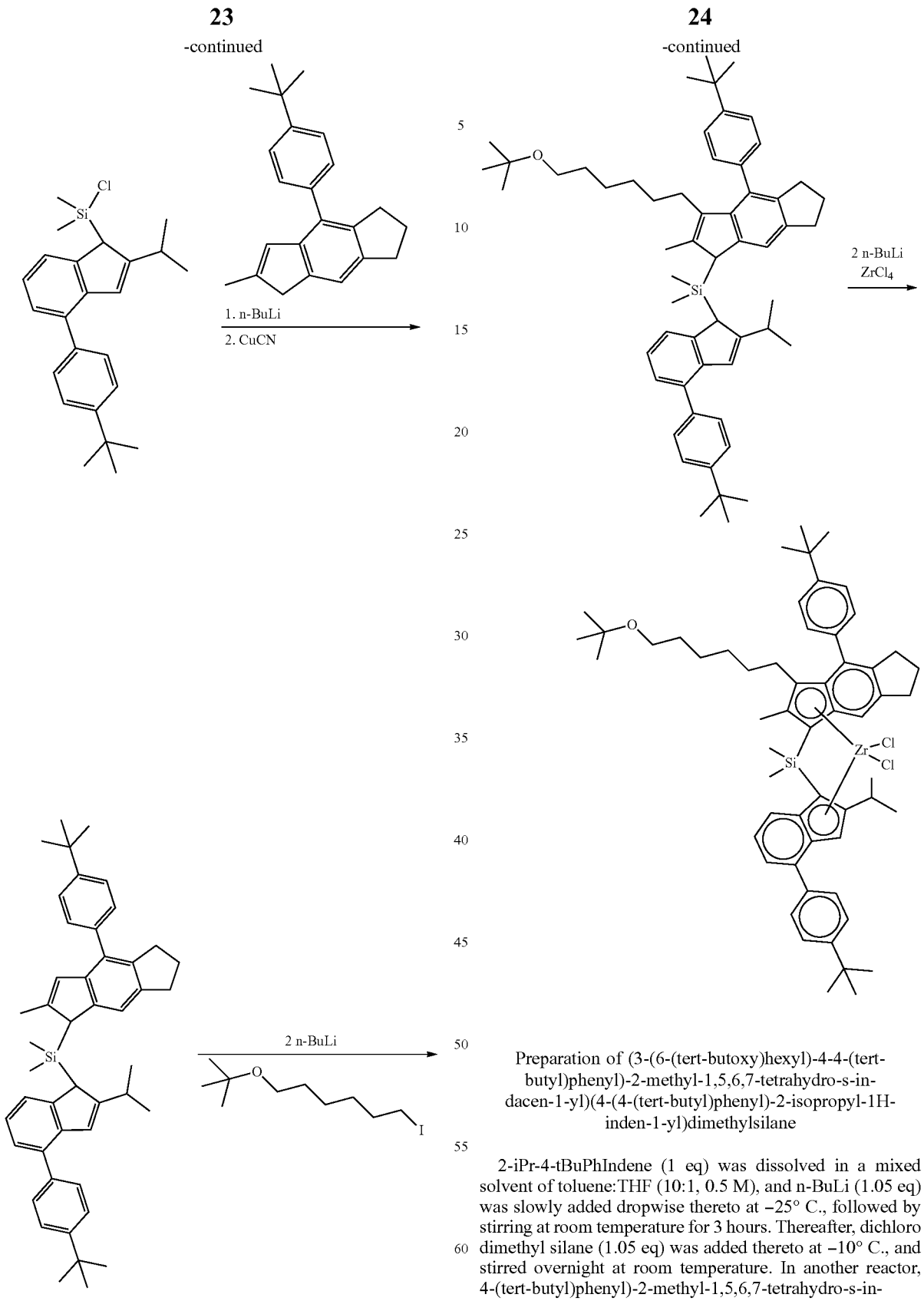

Preparation of (3-(6-(tert-butoxy)hexyl)-4-4-(tert-butyl)phenyl)-2-methyl-1,5,6,7-tetrahydro-s-indacen-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 4-(tert-butyl)phenyl)-2-methyl-1,5,6,7-tetrahydro-s-indacene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-butoxyhexyl-iodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl (3-(6-(tert-butoxy)hexyl)-4-(4-(tert-butyl)phenyl)-2-methyl-1,5,6,7-tetrahydro-s-indacen-1-yl)(4-(4-(tert-butyl)phenyl)-2-isopropyl-1H-inden-1-yl) Zirconium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing ZrCl$_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid metallocene compound.

$^1$H-NMR (500 MHZ, CDCl$_3$): 8.29 (d, 1H), 7.31-7.39 (m, 11H), 6.36 (s, 1H), 3.52 (t, 2H), 2.38-2.44 (m, 5H), 2.12 (s, 3H), 1.92-1.95 (m, 4H), 1.40-1.50 (m, 8H), 1.31 (s, 18H), 0.91 (d, 6H), 0.86 (s, 6H)

Preparation of Second Metallocene Compound

Synthesis Example 3

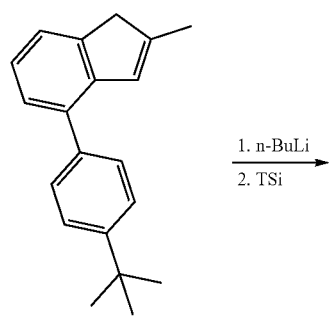

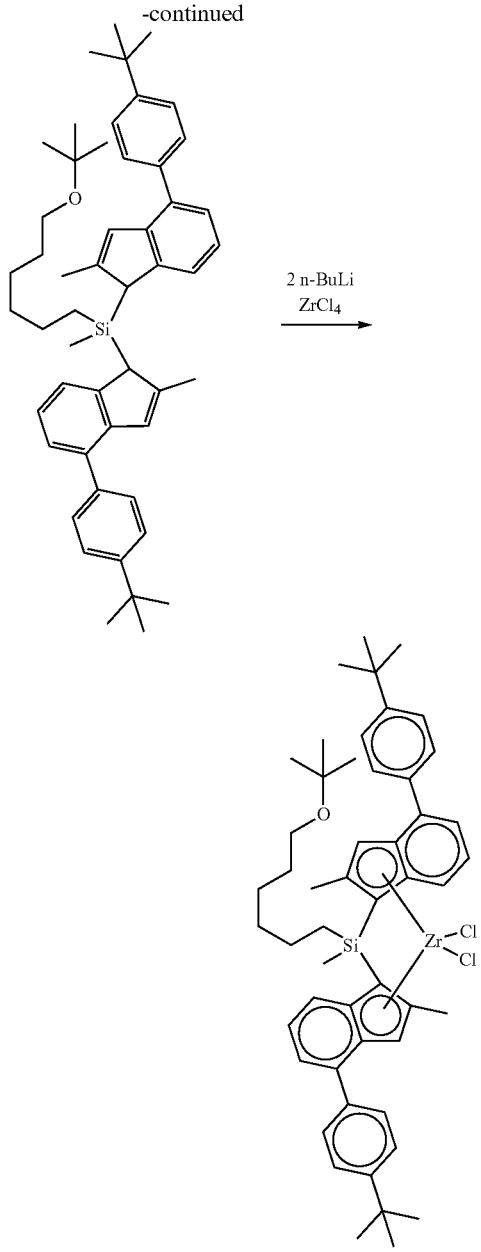

Preparation of bis(4-(4-(tert-butyl)phenyl)-2-methyl-1H-inden-1-yl)(6-(tert-butoxy)hexylmethylsilane 2-Me-4-tBuPhIndene (1 eq) was dissolved in a mixed solvent of toluene:THF (10:1, 0.5 M), and n-BuLi (2.1 eq) was slowly added dropwise thereto at −25° C., followed by stirring at room temperature for 3 hours. Thereafter, CuCN (2 mol %) was added thereto, and stirred for 30 minutes. Thereafter, dichloro (6-(tert-butoxy)hexylmethyl silane (TSi, 0.53 eq) was added thereto at −10° C., followed by stirring overnight at room temperature. Then, it was worked-up with water to obtain a ligand.

Preparation of bis(4-(4-(tert-butyl)phenyl)-2-methyl-1H-inden-1-yl)(6-(tert-butoxy)hexylmethylsilane The ligand was dissolved in a mixed solvent of toluene:ether (2:1, 0.53 M), and n-BuLi (2.05 eq) was added at −25°

C., followed by stirring at room temperature for 5 hours. A slurry was prepared by mixing ZrCl$_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid metallocene compound.

Preparation of Supported Catalyst

Example 1: Preparation of Hybrid Supported Metallocene Catalyst

After adding 50 mL of toluene to a Pico reactor (manufactured by Buch), 10 g of silica (SP2408HT) was added thereto. 12 mmol/g Si of methyl aluminoxane (MAO) was added thereto and reacted at 95° C. for 12 hours. Thereafter, 90 μmol/g Si of the first metallocene compound prepared in Synthesis Example 1 was dissolved in toluene and added thereto, followed by reaction at 50° C. for 2 hours.

After completion of the reaction, 30 μmol/g Si of the second metallocene compound prepared in Synthesis Example 3 was dissolved in toluene and added thereto, followed by reaction at 50° C. for 2 hours.

After completion of the reaction, the resulting mixture was washed with toluene and hexane, and then vacuum-dried to obtain a hybrid supported metallocene catalyst in the form of solid particles.

Examples 2 to 3 and Comparative Examples 1 to 3: Preparation of Hybrid Supported Metallocene Catalyst Hybrid supported metallocene catalysts were prepared in the same manner as in Example 1, except that the type and content of the first metallocene compound and the second metallocene compound were changed as shown in Table 1 below.

Comparative Example 4: Preparation of Single Supported Metallocene Catalyst

After adding 50 mL of toluene to a Pico reactor (manufactured by Buch), 10 g of silica (SP2408HT) was added thereto. 12 mmol/g Si of methyl aluminoxane (MAO) was added thereto and reacted at 95° C. for 12 hours. Thereafter, 90 μmol/g Si of the first metallocene compound prepared in Synthesis Example 1 was dissolved in toluene and added thereto, followed by reaction at 50° C. for 2 hours.

After completion of the reaction, the resulting mixture was washed with toluene and hexane, and then vacuum-dried to obtain a single supported metallocene catalyst in the form of solid particles.

Comparative Examples 5 and 6: Preparation of Single Supported Metallocene Catalyst Single supported metallocene catalysts were prepared in the same manner as in Comparative Example 4, except that the type of the metallocene compound was changed as shown in Table 1 below.

TABLE 1

| Entry | Supported catalyst | First metallocene compound | | Second metallocene compound | |
|---|---|---|---|---|---|
| | | Compound | Content (μmol/g Si) | Compound | Content (μmol/g Si) |
| 1 | Comp. Ex. 1 | Syn. Ex. 1 | 150 | Syn. Ex. 3 | 30 |
| 2 | Ex. 1 | Syn. Ex. 1 | 90 | Syn. Ex. 3 | 30 |
| 3 | Ex. 2 | Syn. Ex. 1 | 60 | Syn. Ex. 3 | 60 |
| 4 | Comp. Ex. 2 | Syn. Ex. 1 | 30 | Syn. Ex. 3 | 90 |
| 5 | Comp. Ex. 3 | Syn. Ex. 1 | 30 | Syn. Ex. 3 | 150 |
| 6 | Ex. 3 | Syn. Ex. 2 | 90 | Syn. Ex. 3 | 30 |
| 7 | Comp. Ex. 4 | Syn. Ex. 1 | 90 | — | — |
| 8 | Comp. Ex. 5 | Syn. Ex. 2 | 90 | — | — |
| 9 | Comp. Ex. 6 | — | — | Syn. Ex. 3 | 90 |

Polymerization of Homopolypropylene

Under an argon atmosphere, 3 mL of triethylaluminum was added to a 2 L stainless reactor, 827 ppm of hydrogen gas was added thereto, and then 1.5 L of propylene was added thereto. At this time, the amount of hydrogen gas added is a numerical value based on the propylene content.

After stirring for 10 minutes, a slurry was prepared with 30 mg of the supported catalyst and 20 ml of hexane at 20° C., and then added to the reactor under an argon atmosphere. After gradually raising the reactor temperature to 70° C., a homopolymerization process of propylene was performed under a pressure condition of 25 bar for 1 hour, and unreacted propylene was vented.

Evaluation of Physical Properties of Homopolypropylene

The activity of the supported catalyst prepared in one of Examples and Comparative Examples, and physical properties of the polypropylene prepared in the presence of each supported catalyst were evaluated in the following manner. The results are shown in Table 2 below.

(1) Polymerization Activity (kg PP/g cat·hr):

The activity was calculated by a ratio of the weight of the prepared polypropylene (kg PP) to the mass of the used supported catalyst (g) per unit time (h).

(2) Crystallization Temperature (Tc, ° C.)

The crystallization temperature of the polypropylene was measured using a differential scanning calorimeter (DSC, device name: DSC 2920, manufacturer: TA instrument).

After heating the polymer to 200° C. by increasing the temperature, the temperature was maintained at that temperature for 5 minutes, and then lowered to 30° C. Thereafter, the temperature was increased again, and the temperature at the top of the DSC curve was measured as the melting point (Tm). Then, the temperature was lowered to 30° C. again, and the temperature at the top of the DSC curve was measured as the crystallization temperature (Tc). Herein, the temperature was increased and lowered at a rate of 10° C./min, respectively. The melting point and the crystallization temperature were measured in the section where the temperature rises and falls for the second time, respectively.

(3) Tacticity (Pentad Sequence Distribution, mmmm, %)

The tacticity (pentad sequence distribution) of the polypropylene was measured using quantitative nuclear magnetic resonance (NMR) spectroscopy as in the paper, V. Busico and R. Cipullo, Progress in Polymer Science, 2001, 26, 443-533.

Specifically, the tacticity (pentad sequence distribution) of the polypropylene of Examples and Comparative Examples was expressed as % of pentad (mmmm) sequence having tacticity of all pentad sequences, after measuring sequence distribution at pentad level by means of $^{13}$C-NMR. The mmmm % is a value based on moles.

At this time, 500 MHz NMR from Bruker was used as a measuring device. And, polypropylene was dissolved in 1.1.2.2-tetrachloroethane (TCE-$d_2$) solvent and measured at an absolute temperature of 393K ($^{13}$C; pulse sequence=zgig30, ns=4096, $d_1$=10 sec, $^1$H; pulse sequence=zg30, ns=128, $d_1$=3 sec). The sequence distribution was analyzed referring to the analysis method AMT-3989-0k, and tacticity (mmmm %) was calculated according to the paper, V. Busico and R. Cipullo, Progress in Polymer Science, 2001, 26, 443-533.

(4) Elongation Viscosity Ascent Rate (EA)

The elongation viscosity was measured using an ARES-G2 Rheometer manufactured by TA Instruments. A specimen was prepared using CPP (Cone and Partitioned Plate Accessory) of the device. The CPP consists of a 25 mm annular plate, a 10 mm central plate is located within the annular plate, and the lower geometry is a 25 mm 0.1 rad cone. After preparing the specimen in this way, the elongation viscosity (μ, unit: Pa·s) of polypropylene was measured at a shear rate of 0.1 s$^{-1}$ at 175° C. Using this, a graph of elongation viscosity according to time (step time, seconds) was obtained, and the elongation viscosity ascent rate was calculated using the following equation.

Elongation viscosity ascent rate (EA)=(Elongation viscosity at a measurement time of 10$^{1.1}$ seconds)/(Elongation viscosity at a measurement time of 10$^0$ seconds)    [Equation 1]

Referring to Table 2, it can be seen that the hybrid supported metallocene catalyst of the present disclosure exhibited excellent activity in propylene polymerization, and the prepared polypropylene had a high crystallization temperature, tacticity, and a high elongation viscosity ascent rate.

However, it was confirmed that the single supported catalysts of the first metallocene compound (Comparative Examples 4 and 5) or the hybrid supported catalyst having an excessively high content of the first metallocene compound (Comparative Example 1) had low activity in propylene polymerization, and tacticity of the prepared polypropylene was significantly lowered. In addition, the polypropylene prepared with the catalysts of Comparative Examples 1, 4, and 5 had a low melting point, which was too low to measure, so that a crystallization temperature could not be obtained. In addition, the viscosity at 175° C. was too low to measure the elongation viscosity ascent rate.

Conversely, it was confirmed that the single supported catalyst of the second metallocene compound (Comparative Example 6) or the hybrid supported catalysts having a high content of the second metallocene compound (Comparative Examples 2 and 3) had excellent catalytic activity. However, the crystallization temperature of the prepared polypropylene was low and the elongation viscosity ascent rate was significantly lower than that of the hybrid supported metallocene catalyst of the present disclosure.

From the above results, it could be confirmed that the hybrid supported metallocene catalyst of the present disclosure can be usefully used in the preparation of a polypropylene having high and improved melt strength by introducing long chain branches (LCB).

The invention claimed is:

1. A hybrid supported metallocene catalyst, comprising at least one first metallocene compound selected from a compound represented by Chemical Formula 1; at least one second metallocene compound selected from a compound

TABLE 2

| Entry | Supported catalyst | Molar ratio of catalyst precursors* | Activity (kg PP/g cat · hr) | Tc (° C.) | Tacticity (mmmm, %) | EA |
|---|---|---|---|---|---|---|
| 1 | Comp. Ex. 1 | 5:1 | 8.7 | not measurable | 50.1 | not measurable |
| 2 | Ex. 1 | 3:1 | 13.0 | 127 | 82.3 | 6.03 |
| 3 | Ex. 2 | 1:1 | 12.8 | 126 | 83.1 | 5.83 |
| 4 | Comp. Ex. 2 | 1:3 | 13.0 | 103 | 95.1 | 2.18 |
| 5 | Comp. Ex. 3 | 1:5 | 15.0 | 108 | 97.2 | 0.81 |
| 6 | Ex. 3 | 3:1 | 12.6 | 127 | 82.1 | 6.04 |
| 7 | Comp. Ex. 4 | 1st metallocene alone (Syn. Ex. 1) | 6.2 | not measurable | 27.2 | not measurable |
| 8 | Comp. Ex. 5 | 1st metallocene alone (Syn. Ex. 2) | 6.0 | not measurable | 25.4 | not measurable |
| 9 | Comp. Ex. 6 | 2nd metallocene alone | 13.0 | 102 | 98.0 | 0.78 |

*In Table 2, the molar ratio of catalyst precursors is represented by the molar ratio of the first metallocene compound: the second metallocene compound.

represented by Chemical Formula 2; and a support on which the first and the second metallocene compounds are supported, wherein a molar ratio of the first metallocene compound and the second metallocene compound is 4:1 to 1:1:

[Chemical Formula 1]

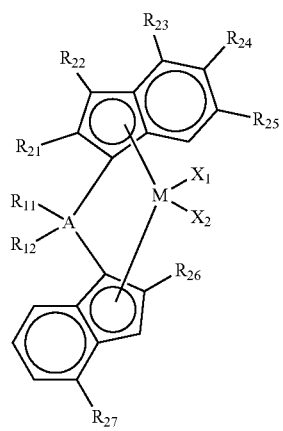

wherein in Chemical Formula 1,
M is a Group 4 transition metal,
$X^1$ and $X^2$ are each independently hydrogen; halogen; or $C_{1-20}$ alkyl;
A is carbon or silicon,
$R_{11}$ and $R_{12}$ are each independently hydrogen; halogen; $C_{1-20}$ alkyl; $C_{2-20}$ alkoxyalkyl; or $C_{6-20}$ aryl;
$R_{21}$ is methyl,
$R_{22}$ is $C_{3-20}$ alkyl; $C_{3-20}$ alkoxyalkyl; or $C_{3-20}$ alkenyl,
$R_{23}$ is unsubstituted $C_{6-20}$ aryl; or $C_{7-20}$ alkylaryl,
$R_{24}$ and $R_{25}$ are each hydrogen; or $R_{24}$ and $R_{25}$ are connected with each other to form a $C_{3-10}$ cycloalkane ring,
$R_{26}$ is $C_{1-20}$ alkyl, and
$R_{27}$ is unsubstituted $C_{6-20}$ aryl; or $C_{7-20}$ alkylaryl,

[Chemical Formula 2]

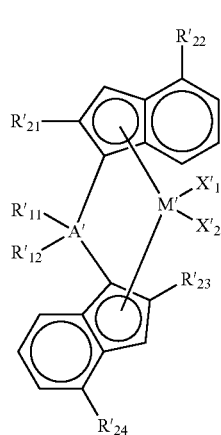

wherein in Chemical Formula 2,
M' is a Group 4 transition metal,
$X'_1$ and $X'_2$ are each independently halogen,
A' is carbon or silicon,
$R'_{11}$ and $R'_{12}$ are each independently $C_{1-20}$ alkyl; $C_{6-20}$ aryl; or $C_{2-20}$ alkoxyalkyl,
$R'_{21}$ and $R'_{23}$ are each independently $C_{1-20}$ alkyl, and $R'_{22}$ and $R'_{24}$ are each independently $C_{6-30}$ alkylaryl; or $C_{6-30}$ aryl.

2. The hybrid supported metallocene catalyst of claim 1, wherein $R_{22}$ is $C_{3-10}$ alkyl; $C_{3-10}$ alkoxyalkyl; or $C_{3-10}$ alkenyl.

3. The hybrid supported metallocene catalyst of claim 1, wherein $R_{23}$ is unsubstituted phenyl; or phenyl substituted with $C_{1-10}$ alkyl.

4. The hybrid supported metallocene catalyst of claim 1, wherein $R_{24}$ and $R_{25}$ are each hydrogen; or $R_{24}$ and $R_{25}$ are connected with each other to form a cyclopentane ring or a cyclohexane ring.

5. The hybrid supported metallocene catalyst of claim 1, wherein $R_{27}$ is unsubstituted phenyl; or phenyl substituted with $C_{1-10}$ alkyl.

6. The hybrid supported metallocene catalyst of claim 1,
wherein M is zirconium or hafnium,
$X_1$ and $X_2$ are each independently halogen,
A is silicon,
$R_{11}$ and $R_{12}$ are each independently $C_{1-10}$ alkyl; $C_{2-10}$ alkoxyalkyl; or $C_{6-10}$ aryl,
$R_{22}$ is $C_{3-10}$ alkyl; $C_{3-10}$ alkoxyalkyl; or $C_{3-10}$ alkenyl,
$R_{23}$ is unsubstituted phenyl; or phenyl substituted with $C_{1-10}$ alkyl,
$R_{24}$ and $R_{25}$ are each hydrogen; or $R_{24}$ and $R_{25}$ are connected with each other to form a cyclopentane ring or a cyclohexane ring, and
$R_{27}$ is unsubstituted phenyl; or phenyl substituted with $C_{1-10}$ alkyl.

7. The hybrid supported metallocene catalyst of claim 1, wherein the first metallocene compound represented by the Chemical Formula 1 is a compound selected from the group consisting of:

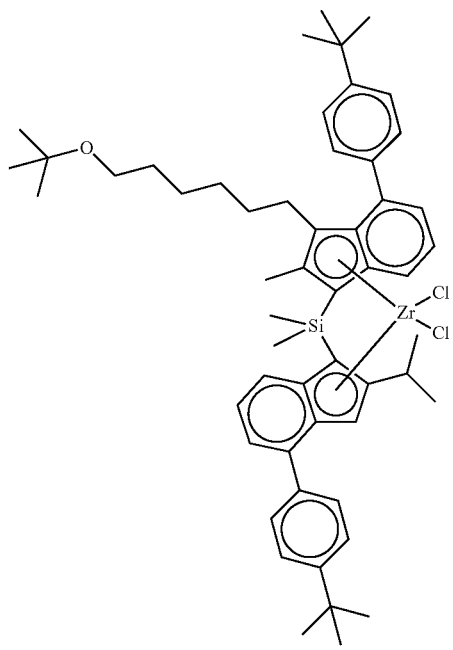

33
-continued
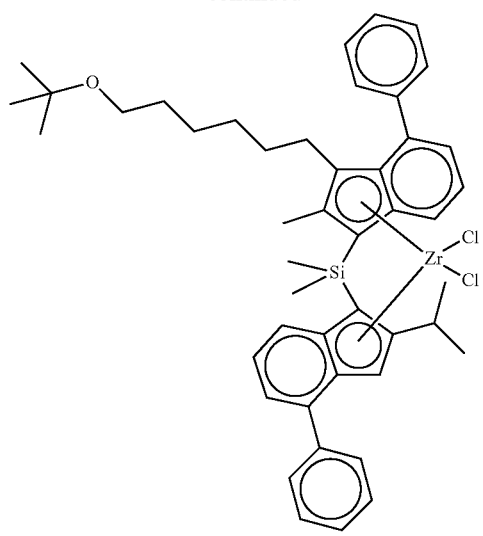
34
-continued
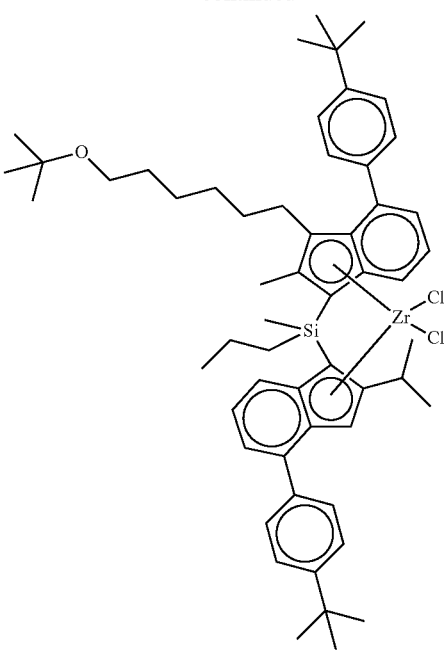
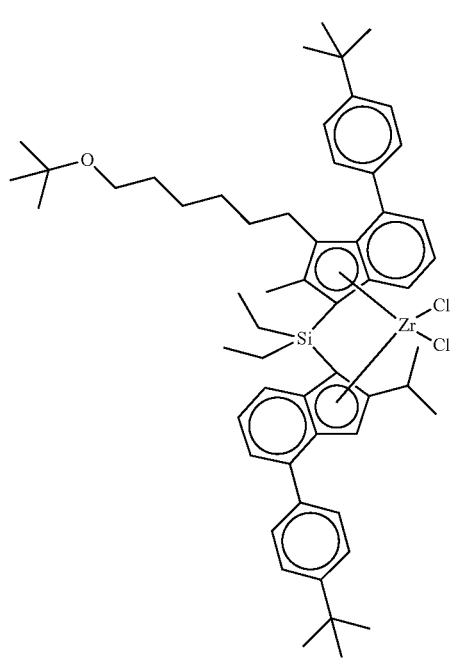
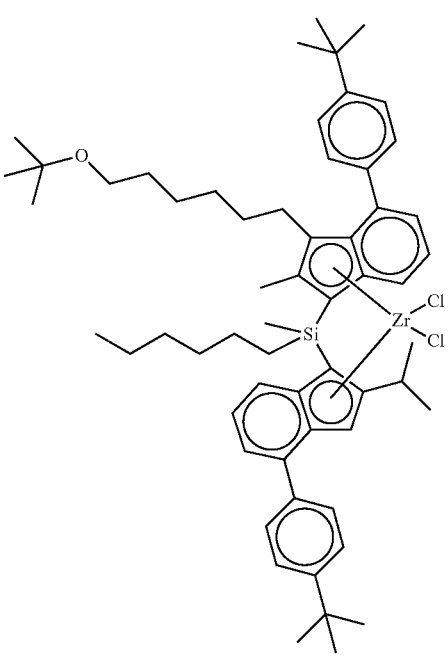

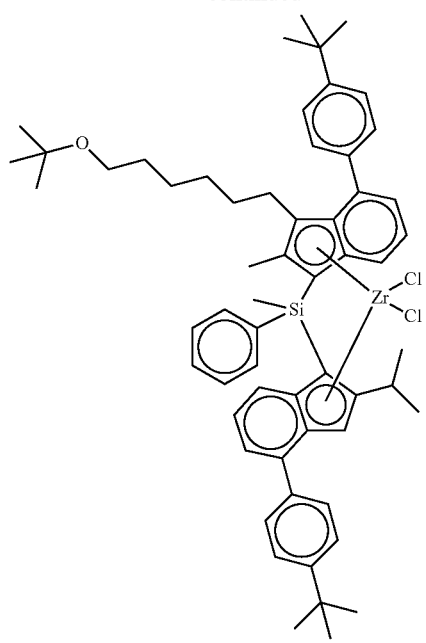
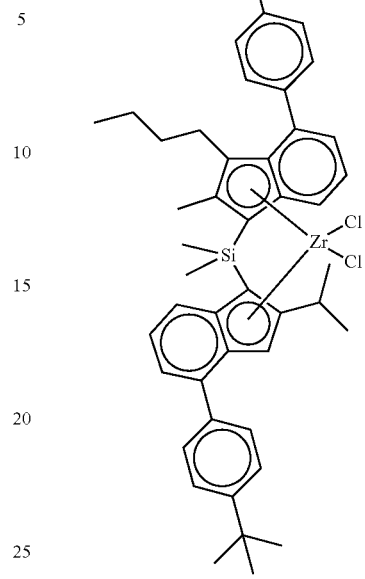
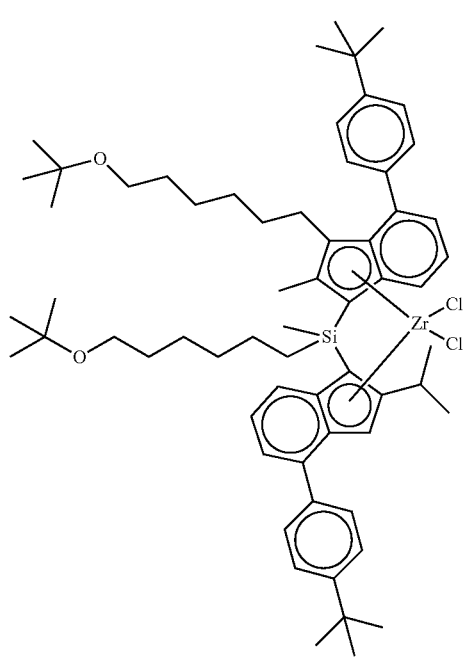
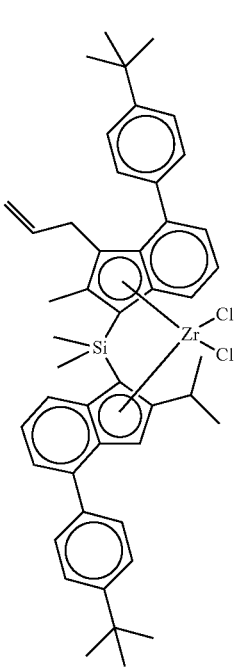

37
-continued
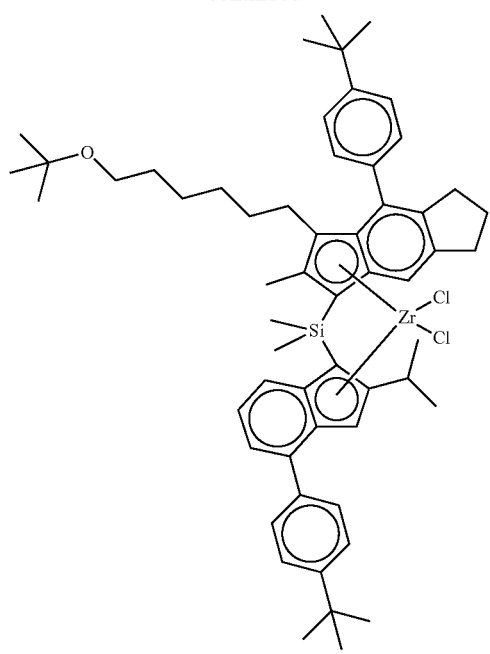
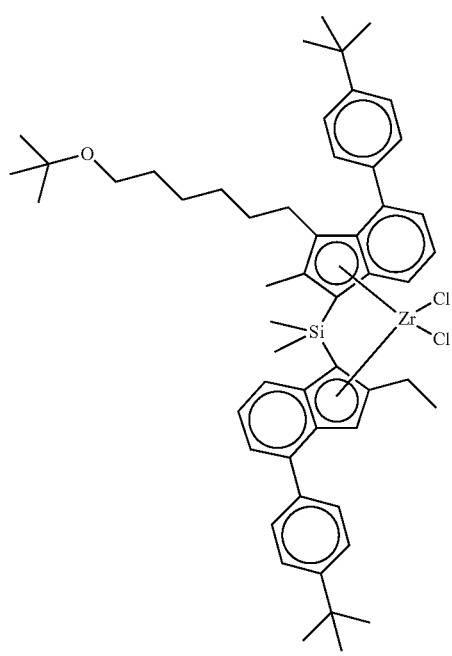
38
-continued
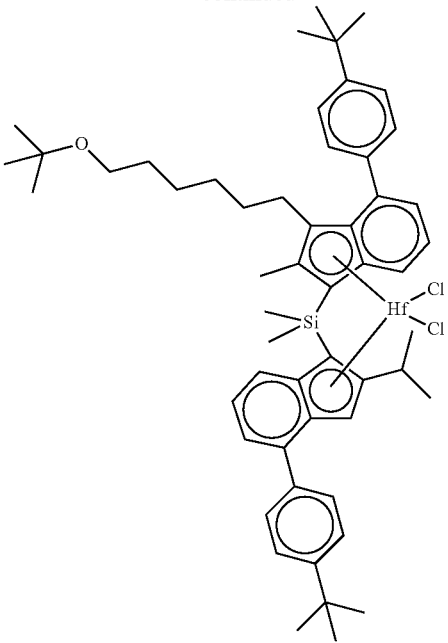
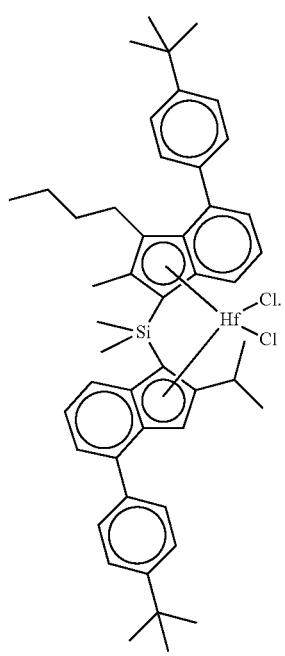
8. The hybrid supported metallocene catalyst of claim 1, wherein $R'_{21}$ and $R'_{23}$ are each independently $C_{1-10}$ alkyl, and
$R'_{22}$ and $R'_{24}$ are each independently $C_{6-10}$ alkylaryl.
9. The hybrid supported metallocene catalyst of claim 1, wherein the second metallocene compound represented by the Chemical Formula 2 is:

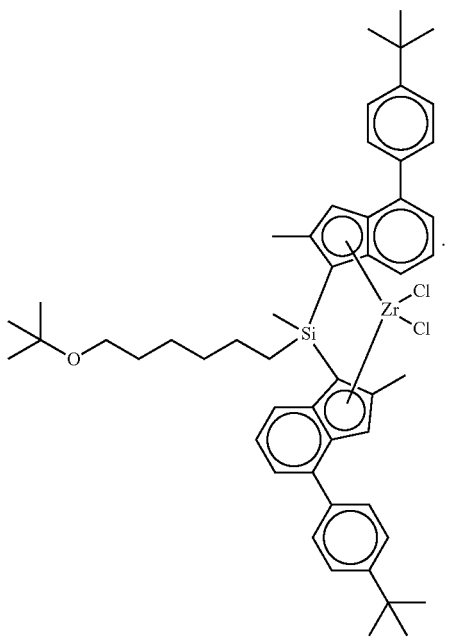

10. The hybrid supported metallocene catalyst of claim 1, wherein the molar ratio of the first metallocene compound and the second metallocene compound is 3:1 to 1:1.

11. The hybrid supported metallocene catalyst of claim 1, wherein the support is at least one selected from the group consisting of silica, silica-alumina, and silica-magnesia.

12. The hybrid supported metallocene catalyst of claim 1, further comprising at least one cocatalyst selected from the group consisting of compounds represented by Chemical Formulae 3 and 4:

$$—[Al(R_{31})—O]_m— \quad \text{[Chemical Formula 3]}$$

wherein in Chemical Formula 3,
each $R^{31}$ is independently halogen, $C_{1-20}$ alkyl or $C_{1-20}$ haloalkyl; and
m is an integer of 2 or more;

$$J(R_{32})_3 \quad \text{[Chemical Formula 4]}$$

wherein in Chemical Formula 4,
each $R^{32}$ is independently halogen, $C_{1-20}$ alkyl or $C_{1-20}$ haloalkyl; and
J is aluminum or boron.

13. A method for preparing a polypropylene, comprising a step of polymerizing propylene monomers in the presence of the hybrid supported metallocene catalyst of claim 1.

14. The method for preparing a polypropylene of claim 13, wherein the polypropylene has an elongation viscosity ascent rate (EA) represented by the following Equation 1 of 5.0 or more, when the elongation viscosity of the polypropylene is measured at a shear rate of 0.1 s$^{-1}$ at 175° C.:

$$\text{Elongation viscosity ascent rate (EA)}=(\text{Elongation viscosity at a measurement time of } 10^{1.1} \text{ seconds})/(\text{Elongation viscosity at a measurement time of } 10^0 \text{ seconds}). \quad \text{[Equation 1]}$$

15. The method for preparing a polypropylene of claim 13, wherein the polypropylene has a crystallization temperature of 120° C. or more.

\* \* \* \* \*